United States Patent
Yamanaka et al.

(10) Patent No.: US 10,312,535 B2
(45) Date of Patent: Jun. 4, 2019

(54) FUEL CELL SYSTEM INCLUDING CONTROL OF ROTATION SPEED OF A GAS PUMP

(71) Applicant: TOYOTA JIDOSHA KABUSHIKI KAISHA, Toyota-shi, Aichi-ken (JP)

(72) Inventors: Tomio Yamanaka, Nagoya (JP); Mitsuhiro Nada, Toyota (JP); Yoshiaki Naganuma, Toyota (JP); Masashi Toida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/246,667

(22) Filed: Aug. 25, 2016

(65) Prior Publication Data
US 2017/0069922 A1 Mar. 9, 2017

(30) Foreign Application Priority Data
Sep. 3, 2015 (JP) .................. 2015-173897

(51) Int. Cl.
*H01M 8/04223* (2016.01)
*H01M 8/04089* (2016.01)
(Continued)

(52) U.S. Cl.
CPC ... *H01M 8/04253* (2013.01); *H01M 8/04097* (2013.01); *H01M 8/04111* (2013.01);
(Continued)

(58) Field of Classification Search
CPC ......... H01M 8/04253; H01M 8/04097; H01M 8/04111; H01M 8/04164; H01M 8/04365;
(Continued)

(56) References Cited

U.S. PATENT DOCUMENTS

2003/0232226 A1 12/2003 Morishima et al.
2004/0106026 A1 6/2004 Fujita et al.
(Continued)

FOREIGN PATENT DOCUMENTS

DE 11 2006 003 112 T5 10/2008
JP 2004-172025 6/2004
(Continued)

OTHER PUBLICATIONS

English translation of JP2007035517A to Kawaguchi (Year: 2007).*
Office Action issued in U.S. Appl. No. 14/939,537 dated Sep. 29, 2017.

*Primary Examiner* — Lucas J. O'Donnell
(74) *Attorney, Agent, or Firm* — Finnegan, Henderson, Farabow, Garrett & Dunner, LLP (57) ABSTRACT

There is provided a fuel cell system. The fuel cell system includes a gas pump that is configured to have a rotating body and circulate an exhaust gas discharged from a fuel cell and is provided in a circulation passage configured to connect a discharge passage of the exhaust gas with a fuel gas supply passage. When temperature of the fuel cell is higher than a reference temperature that is a temperature that allows water to be introduced in a supercooled state into the gas pump, the fuel cell system controls the rotation speed of the rotating body of the gas pump to a first rotation speed corresponding to a power generation demand for the fuel cell. When the temperature of the fuel cell is not higher than the reference temperature, the fuel cell system controls the rotation speed of the rotating body of the gas pump to a second rotation speed that is lower than the first rotation speed. The second rotation speed is a rotation speed in a low rotation speed range that allows the water in the supercooled state introduced into the gas pump to be extended between the rotating body and a rotating body-surrounding housing
(Continued)

wall. This configuration suppresses freezing of the gas pump in the circulation passage of the exhaust gas at a start-up time of the fuel cell.

2 Claims, 7 Drawing Sheets

(51) Int. Cl.
  *H01M 8/04111* (2016.01)
  *H01M 8/0432* (2016.01)
  *H01M 8/04537* (2016.01)
  *H01M 8/04746* (2016.01)
  *H01M 8/04119* (2016.01)
  *H01M 8/04701* (2016.01)

(52) U.S. Cl.
  CPC ... *H01M 8/04164* (2013.01); *H01M 8/04365* (2013.01); *H01M 8/04373* (2013.01); *H01M 8/04604* (2013.01); *H01M 8/04619* (2013.01); *H01M 8/04738* (2013.01); *H01M 8/04776* (2013.01); *H01M 2250/20* (2013.01); *Y02T 90/32* (2013.01)

(58) Field of Classification Search
  CPC ......... H01M 8/04373; H01M 8/04604; H01M 8/04619; H01M 8/04738; H01M 8/04776; H01M 2250/20; Y02T 90/32
  See application file for complete search history.

(56) References Cited

U.S. PATENT DOCUMENTS

| | | |
|---|---|---|
| 2005/0112424 A1 | 5/2005 | Hirano et al. |
| 2009/0047163 A1 | 2/2009 | Fujita |
| 2009/0169928 A1 | 7/2009 | Nishimura et al. |
| 2012/0183875 A1* | 7/2012 | Yumita ............ H01M 8/04223 429/434 |
| 2016/0141665 A1* | 5/2016 | Toida ............... H01M 8/04201 429/415 |

FOREIGN PATENT DOCUMENTS

| | | |
|---|---|---|
| JP | 2005-158426 A | 6/2005 |
| JP | 2005-285686 | 10/2005 |
| JP | 2007-024015 A | 2/2007 |
| JP | 2007-035517 A | 2/2007 |
| JP | 2008-019727 A | 1/2008 |
| JP | 2008-059977 A | 3/2008 |
| JP | 2008-077959 A | 4/2008 |
| JP | 2009-138713 A | 6/2009 |
| JP | 2009-250215 A | 10/2009 |
| JP | 5382627 B | 10/2013 |
| JP | 2016-96057 | 5/2016 |

* cited by examiner

FUEL CELL SYSTEM INCLUDING CONTROL OF ROTATION SPEED OF A GAS PUMP

CROSS-REFERENCE TO RELATED APPLICATIONS

The present application claims priority from Japanese patent application P2015-173897 filed on Sep. 3, 2015, the content of which is hereby incorporated by reference into this application.

BACKGROUND

Field

The present disclosure relates to a fuel cell system.

Related Art

A fuel cell included in a fuel cell system is configured to receive supplies of a fuel gas (for example, hydrogen gas) and an oxygen-containing gas (for example, the air) and generate electric power by an electrochemical reaction of the fuel gas and the oxygen-containing gas. The gas that is not consumed in the electrochemical reaction is discharged from the fuel cell. The exhaust gas includes water. When a vehicle equipped with the fuel cell system is placed in a subzero environment, an electric device, for example a motor-operated valve or a solenoid valve provided in an exhaust gas passage to open and close the exhaust gas passage is likely to be frozen. Freezing such a valve may cause a failure in supplying the gas into the fuel cell. A proposed control technique checks the possibility that the valve is frozen, upon determination that the valve is likely to be seized by freezing, drives or heats a valve body to resolve freeze or seizure, and subsequently starts up the fuel cell (for example, JP 2005-285686A). This control technique advantageously starts up the fuel cell after resolving freeze of the valve.

SUMMARY

Another problem has been found with regard to a fuel gas pump (hereinafter simply referred to as "gas pump") provided in a circulation passage at a cold start of the fuel cell system. A discharge passage is connected with an exhaust port of the fuel gas in the fuel cell. The unused fuel gas is included in the exhaust gas discharged to the discharge passage. The gas pump is accordingly provided in the circulation passage configured to connect the discharge passes with a fuel gas supply passage, so as to circulate the exhaust gas to the fuel cell. The gas pump generally has a rotating body and is configured to feed the exhaust gas by rotation of the rotating body. When the fuel cell has low temperature, water supercooled in the fuel cell (supercooled water) is likely to be introduced into the gas pump. The gas pump is generally configured to change the rotation speed according to the operating conditions. This may cause a problem that the supercooled water is likely to be affected by rotation of the rotating body to be frozen and cause seizure of the rotating body.

At least part of the above problem that the gas pump provided in the circulation passage is likely to be frozen in the fuel cell system may be solved by any of the following aspects.

(1) According to one aspect, there is provided a fuel cell system. This fuel cell system comprises a fuel cell that is configured to generate electric power by an electrochemical reaction of a fuel included in a fuel gas with oxygen included in an oxygen-containing gas; a fuel gas supply passage that is connected with a supply port of the fuel gas in the fuel cell; an exhaust gas discharge passage that is connected with a discharge port of the fuel gas in the fuel cell; a circulation passage that is configured to connect the exhaust gas discharge passage with the fuel gas supply passage; a gas pump that is provided in the circulation passage and is configured to have a rotating body and circulate the exhaust gas discharged from the fuel cell to the fuel cell by rotation of the rotating body; a gas pump controller that is configured to control rotation speed of the rotating body of the gas pump; and a temperature acquirer that is configured to obtain temperature of the fuel cell at which water introduced through the circulation passage into the gas pump is generated, at a start-up time of the fuel cell. The gas pump controller is configured to obtain a power generation demand for the fuel fuel cell; control a rotation speed of the rotating body of the gas pump to a first rotation speed corresponding to the power generation demand, when the temperature of the fuel cell is higher than a predetermined reference temperature that is not higher than zero degree Celsius, and control the rotation speed of the rotating body of the gas pump to a second rotation speed that is lower than the first rotation speed, when the temperature of the fuel cell is not higher than the reference temperature. The reference temperature is a temperature that allows the water to be introduced in a supercooled state into the gas pump. The second rotation speed is a rotation speed in a low rotation speed range that allows the water in the supercooled state introduced into the gas pump to be extended between the rotating body and a rotating body-surrounding housing wall.

When the temperature of the fuel cell at which water introduced into the gas pump is generated (hereinafter referred to as "fuel cell temperature") is not higher than the reference temperature that is not higher than zero degree Celsius at the start-up time of the fuel cell, the fuel cell system of this aspect controls the rotation speed of the rotating body of the gas pump to the second rotation speed. The second rotation speed is lower than the first rotation speed to which the rotation speed of the rotating body of the gas pump is controlled when the fuel cell temperature is higher than this reference temperature. The second rotation speed is the rotation speed in the low rotation speed range that allows the water in the supercooled state introduced into the gas pump to be extended between the rotating body and a rotating body-surrounding housing wall. When the fuel cell temperature is not higher than the reference temperature that is not higher than zero degree Celsius, the supercooled water that is supercooled in the fuel cell is likely to be introduced into the gas pump. The rotation speed of the rotating body of the gas pump in this state is the low rotation speed in the low rotation speed range (second rotation speed) described above. Even when the supercooled water is introduced into the gas pump, the fuel cell system of this aspect causes the supercooled water to be extended and thereby reduces the likelihood of a trouble that the supercooled water is affected by rotation of the rotating body of the gas pump to be frozen and cause seizure of the rotating body. Even if the supercooled water is frozen, the frozen supercooled water has been extended between the rotating body and the rotating body-surrounding housing wall. The frozen part can thus be scraped off by the rotating body that is rotated at the second rotation speed that is the low rotation speed. As a result, the fuel cell system of this aspect effectively suppresses freezing of the gas pump provided in the circulation passage at the start-up time of the fuel cell.

When the fuel cell temperature is higher than the reference temperature at the start-up time of the fuel cell, on the other hand, the fuel cell system of this aspect does not cause the supercooled water to flow into the gas pump. This ensures a certain amount of circulation of the exhaust gas by rotation of the rotating body of the gas pump at the first rotation speed corresponding to the power generation demand.

(2) The fuel cell system of the above aspect may further comprise a gas liquid separator that is placed on an upstream side of the gas pump in the circulation passage. When temperature of the gas pump is not higher than a temperature which closes to a freezing point of water adhering to the rotating body, the gas pump controller may set the rotation speed of the rotating body to be lower than a rotation speed that causes water accumulated by the gas liquid separator to be sucked through the circulation passage into the gas pump. This configuration does not cause the water accumulated by the gas liquid separator to be sucked into the gas pump and thereby suppresses freezing of the water adhering to the rotating body of the gas pump. When the temperature of the fuel cell is raised after the start-up of the fuel cell, the exhaust gas warmed in the fuel cell is subjected to gas liquid separation by the gas liquid separator and is then sucked into the gas pump. Accordingly the fuel cell system of this aspect raises the temperature of the gas pump and suppresses freezing or melts the frozen part if any.

There may be provided various aspects other than those described above, for example, a control method of the fuel cell system, a vehicle equipped with the fuel cell system, and a control method of the vehicle.

DESCRIPTION OF EMBODIMENTS

Figure 1:
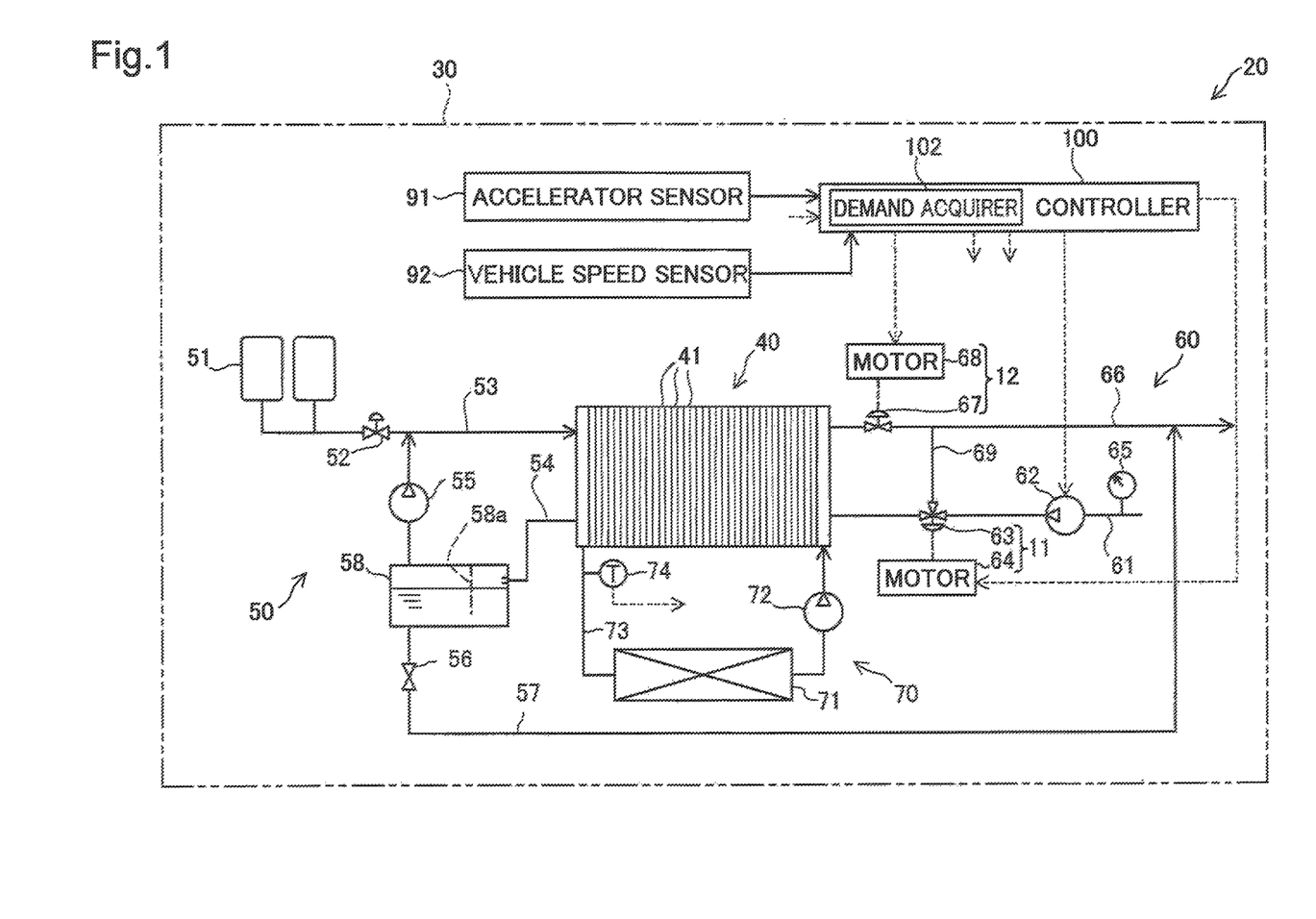
FIG. 1 is a block diagram illustrating the schematic configuration of a fuel cell vehicle.

FIG. 1 is a block diagram illustrating the schematic configuration of a fuel cell vehicle 20. The fuel cell vehicle 20 is a four-wheel vehicle and is equipped with a fuel cell system 30 as shown in FIG. 1.

The fuel cell system 30 may include a fuel cell 40, a hydrogen supply discharge mechanism 50, a cathode gas supply discharge mechanism 60, a cooling water circulation mechanism 70 and a controller 100.

The fuel cell 40 may be a polymer electrolyte fuel cell that receives supplies of hydrogen gas as a fuel gas and the air as an oxygen-containing gas and generates electric power through electrochemical reaction of hydrogen and oxygen. As shown in FIG. 1, the fuel cell 40 has a stack structure by stacking a plurality of unit cells 41. The unit cell 41 includes an anode, a cathode, an electrolyte membrane and separators. In the description hereinafter, the anodes of the plurality of unit cells 41 may be collectively referred to as "anode" or "anode passage". The cathodes of the plurality of unit cells 41 may be collectively referred to as "cathode" or "cathode passage".

The hydrogen supply discharge mechanism 50 is configured to supply and discharge the hydrogen gas to and from the fuel cell 40 and may include a hydrogen tank 51, a regulator 52, a supply passage 53, a circulation passage 54, a hydrogen circulation pump 55, a purge valve 56, a discharge passage 57 and a gas liquid separator 58.

The hydrogen tank 51 is configured to store the hydrogen gas. The supply passage 53 is a hydrogen gas supply passage (fuel gas supply passage) that is extended from the hydrogen tank 51 and is connected with a supply port on the anode side of the fuel cell 40. The regulator 52 provided in this supply passage 53 regulates the pressure and the supply amount of the hydrogen gas stored in the hydrogen tank 51 and supplies the regulated hydrogen gas through the supply passage 53 to the fuel cell 40 or more specifically to the anode of the unit cells 41. The pressure and the supply amount of the hydrogen gas to be supplied to the fuel cell 40 are regulated by drive control of the regulator 52 by the controller 100.

The circulation passage 54 is configured to connect the fuel cell 40 or more specifically an exhaust gas discharge passage portion of the fuel cell 40 connecting with a gas discharge port on the anode side, with the supply passage 53 and introduce an exhaust gas discharged from the anode to the supply passage 53. The gas liquid separator 58 and the hydrogen circulation pump 55 are placed sequentially from the upstream side in the middle of the circulation passage 54. The gas liquid separator 58 is provided in a hollow container form and causes the exhaust gas that is discharged from the anode and flows into the gas liquid separator 58 to be subjected to gas liquid separation by a shieling plate 58a and causes the gas after the gas liquid separation to be flowed out through the circulation passage 54 to the hydrogen circulation pump 55. The gas liquid separator 58 also serves to accumulate the water after the gas liquid separation and discharge the accumulated water through the discharge passage 57.

The hydrogen circulation pump 55 is configured as a gas pump for feeding the hydrogen gas to mix the exhaust gas with the hydrogen gas in the supply passage 53 and circulate and supply the mixed gas to the fuel cell 40. More specifically, the hydrogen circulation pump 55 sucks the exhaust gas separated by the gas liquid separator 58 and resupplies (circulates and supplies) the sucked exhaust gas to the anode of the unit cells 41. The exhaust gas separated by the gas liquid separator 58 mainly consists of the hydrogen gas that is not consumed but is discharged. The detailed configuration of the hydrogen circulation pump 55 will be described later.

The discharge passage 57 is extended from the gas liquid separator 58 to a cathode gas discharge passage 66 (described later) of the cathode gas supply discharge mechanism 60. The purge valve 56 placed in the middle of the discharge passage 57 is opened under control of the controller 100 to introduce the liquid (water) separated by the gas liquid separator 58 to the cathode gas discharge passage 66. According to another embodiment, the liquid separated by the gas liquid separator 58 may be directly discharged out from the discharge passage 57.

The cathode gas supply discharge mechanism 60 is configured to supply and discharge the air to and from the fuel cell 40 and may include a cathode gas supply passage 61, a first motor-operated valve 11, a second motor-operated valve 12, an air compressor 62, a flowmeter 65, the cathode gas discharge passage 66 and a bypass 69. The first motor-operated valve 11 may include a flow dividing valve 63 and a flow dividing valve motor 64. The second motor-operated valve 12 may include a pressure regulating valve 67 and a pressure regulating valve motor 68.

The cathode gas supply passage 61 and the cathode gas discharge passage 66 are provided as flow paths configured to connect the fuel cell 40 with their respective air opening ports. An air cleaner (not shown) is provided at the air opening port of the cathode gas supply passage 61.

The air compressor 62 is placed in the middle of the cathode gas supply passage 61 to take in the air from the air opening port of the cathode gas supply passage 61 and compress the intake air. The air compressor 62 is provided at a position that is closer to the air opening port than a connecting position where the cathode gas supply passage 61 is connected with the bypass 69. The flowmeter 65 serves to measure the flow rate of the cathode gas (the air) taken in by the air compressor 62.

The flow dividing valve 63 is provided on the downstream side of the air compressor 62 in the cathode gas supply passage 61 or, in other words, between the air compressor 62 and the fuel cell 40. The flow dividing valve 63 divides the flow of the cathode gas from the air compressor 62 into the downstream side of the cathode gas supply passage 61 and the bypass 69. This flow dividing valve 63 is also called three-way valve.

The flow dividing valve motor 64 is connected with the flow dividing valve 63 to generate a torque for regulating the opening position of the flow dividing valve 63. The flow dividing valve motor 64 is a stepping motor.

The bypass 69 is a flow path configured to connect the flow dividing valve 63 with the cathode gas discharge passage 66. In the description of this embodiment, "closing the flow dividing valve 63" means disconnecting an upstream portion from a downstream portion of the cathode gas supply passage 61 and connecting the bypass 69 with the upstream portion of the cathode gas supply passage 61. In response to input of a drive pulse for closing the flow dividing valve 63, a valve body of the flow dividing valve 63 is pressed against a valve seat thereof by a stronger force than a simple contact force, so that the valve body and the valve seat of the flow dividing valve 63 are sealed.

The pressure regulating valve 67 is provided in the cathode gas discharge passage 66. The pressure regulating valve 67 regulates the flow passage area of the cathode gas discharge passage 66 according to the opening position. In response to input of a drive pulse for closing the pressure regulating valve 67, a valve body of the pressure regulating valve 67 is pressed against a valve seat thereof by a stronger force than a simple contact force similarly-operated as the flow dividing valve 63, so that the valve body and the valve seat of the pressure regulating valve 67 are sealed. The pressure regulating valve 67 is provided with a pilot valve (not shown). The pilot valve is a mechanism configured to reduce the pressure difference between the upstream side and the downstream side of the cathode gas discharge passage 66 at the zero opening position of the cathode gas discharge passage 66.

The pressure regulating valve motor 68 is connected with the pressure regulating valve 67 to generate a torque for regulating the opening position of the pressure regulating valve 67. The pressure regulating valve motor 68 is a stepping motor.

The air passing through the pressure regulating valve 67 flows through the connecting position with the bypass 69 and is discharged from the air opening port to the atmosphere.

The cooling water circulation mechanism 70 is configured to cool down the fuel cell 40 and may include a radiator 71 and a cooling water circulation pump 72 provided in a cooling water circulation passage 73. The cooling water circulation mechanism 70 circulates the cooling water between the unit cells 41 and the radiator 71, in order to control the operation temperature of the unit cells 41. Such circulation of the cooling water absorbs heat in the unit cells 41 and releases the heat in the radiator 71. The cooling water circulation mechanism 70 may also include a temperature sensor 74 that is provided in the cooling water circulation passage 73 to detect the temperature of the cooling water and output the detected temperature to the controller 100. The controller 100 uses the detected temperature of the temperature sensor 74 as the temperature of the fuel cell 40 to be a parameter of various controls. According to another embodiment, the temperature of the fuel cell 40 may be detected directly.

The controller 100 is specifically provided as an ECU (electronic control unit). The controller 100 performs various controls for controlling the power generation in the fuel cell system 30, in response to a power generation demand for the fuel cell 40. A demand acquirer 102 provided in the controller 100 obtains the power generation demand, based on a sensor signal from an accelerator sensor 91 and a vehicle speed signal from a vehicle speed sensor 92. According to another embodiment, the power generation demand may be determined by a separate circuit structure from the controller 100, for example, another ECU. The controller 100 drives and controls the regulator 52 in the supply passage 53 of the hydrogen supply discharge mechanism 50, drives and controls the air compressor 62 and the first motor-operated valve 11 in the cathode gas supply passage 61 of the cathode gas supply discharge mechanism 60, and drives and controls the second motor-operated valve 12 in the cathode gas discharge passage 66 of the cathode gas supply discharge mechanism 60, so as to regulate the supply amount of the hydrogen gas and the supply amount of the air to the fuel cell and thereby satisfy the power generation demand by power generation of the fuel cell 40. The controller 100 also drives and controls the hydrogen circulation pump 55 in the circulation passage 54 of the hydrogen supply discharge mechanism 50 or more specifically controls rotation of a first rotor 83 and a second rotor 84 of the hydrogen circulation pump 55 (described later), so as to regulate the circulation supply amount of the exhaust gas through the circulation passage 54. The controller 100 accordingly serves as a gas pump controller to regulate the rotation speeds of the rotating bodies, i.e., the rotors of the hydrogen circulation pump 55. The controller 100 output various drive signals to the hydrogen circulation pump 55, the air compressor 62 and the other relevant components described above to achieve such controls. According to another embodiment, a gas pump controller may be provided separately from the controller 100 to regulate the rotation speeds of the rotors of the hydrogen circulation pump 55.

Figure 2:
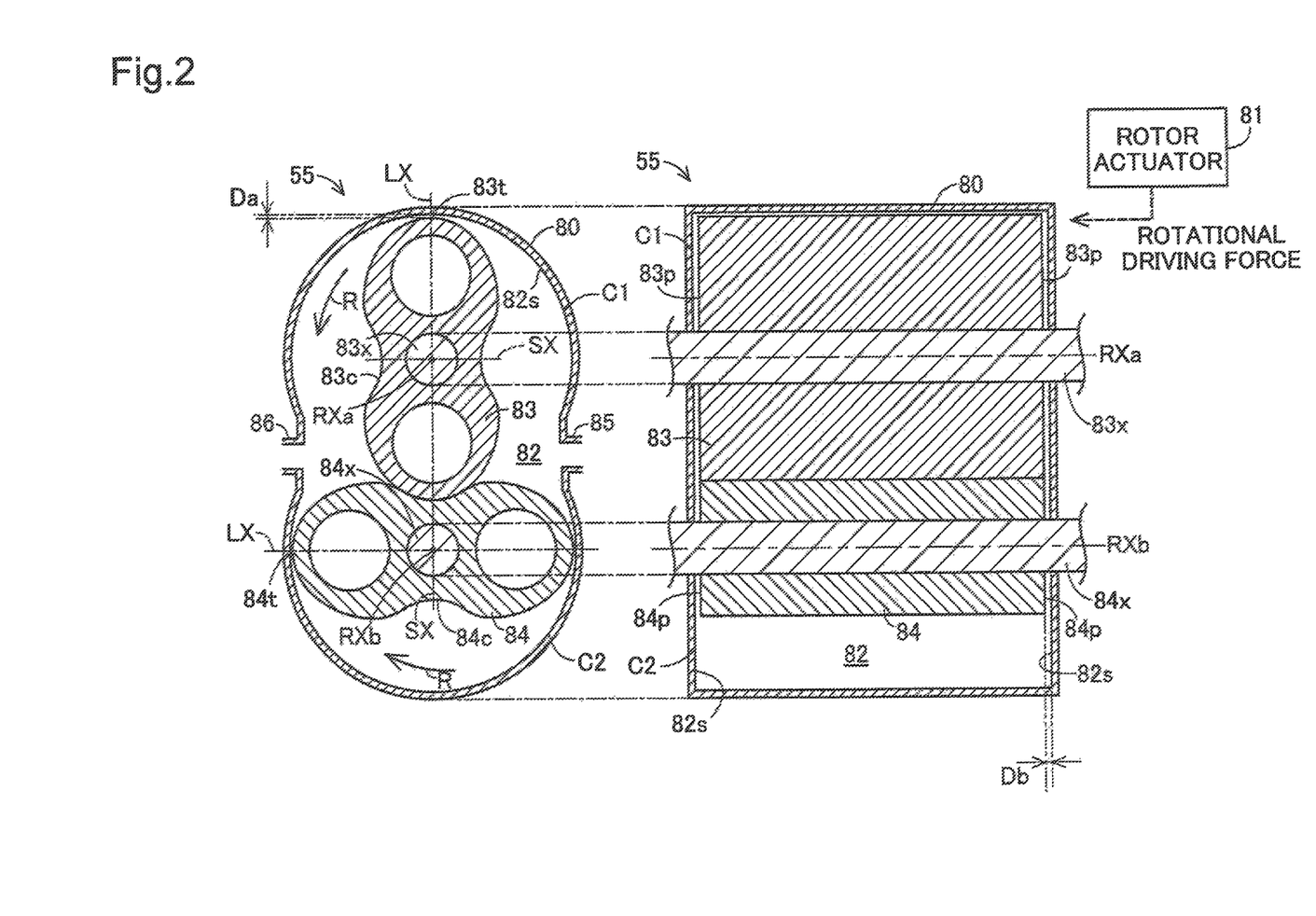
FIG. 2 is a schematic diagram illustrating the configuration of a hydrogen circulation pump.

FIG. 2 is a schematic diagram illustrating the configuration of the hydrogen circulation pump 55. The left-side drawing of FIG. 2 illustrates a schematic section of the hydrogen circulation pump 55 taken along a cutting plane perpendicular to an axial direction of rotating axes RXa and RXb of the first rotor 83 and the second rotor 84 of the hydrogen circulation pump 55. The right-side drawing of FIG. 2 illustrates a schematic section of the hydrogen circulation pump 55 taken along a cutting plane including the rotating axes RXa and RXb of the first rotor 83 and the second rotor 84 of the hydrogen circulation pump 55. The hydrogen circulation pump 55 may include a rotor chamber assembly 80 and a rotor actuator 81. The rotor chamber assembly 80 is provided as a housing of the hydrogen circulation pump 55 and may include a pump chamber 82 as a closed space. The two rotors, i.e., the first rotor 83 and the second rotor 84 are placed inside of the pump chamber 82. The first rotor 83 and the second rotor 84 correspond to the subordinate concept of the rotating body in the claims. The first rotor 83 and the second rotor 84 have substantially identical configurations and are formed to have a sectional shape by constricting a middle portion of an approximately elliptical shape in a direction of a long axis LX (so-called cocoon sectional shape). The first rotor 83 and the second rotor 84 have two-fold rotational symmetry. An inner wall surface 82s of the pump chamber 82 in which the respective rotors 83 and 84 are placed corresponds to the subordinate concept of the rotating body-surrounding housing wall in the claims.

A main rotating shaft 83x is linked with the center of the first rotor 83, and a driven rotating shaft 84x is linked with the center of the second rotor 84. The rotor actuator 81 includes a motor (not shown) configured to transmit the rotational driving force via the main rotating shaft 83x to the first rotor 83 and thereby rotate the first rotor 83. The rotor actuator 81 also rotates the driven rotating shaft 84x to be driven with the main rotating shaft 83x by means of a gear (not shown) and thereby rotate the second rotor 84 along with the first rotor 83. The controller 100 (shown in FIG. 1) controls the motor of the rotor actuator 81 to regulate the rotation speeds of the first rotor 83 and the second rotor 84.

The first rotor 83 and the second rotor 84 have the following positional relationship in the pump chamber 82. In the state that the long axis LX of the first rotor 83 is arranged perpendicular to the long axis LX of the second rotor 84, an end 83t of the first rotor 83 in the direction of the long axis LX is fit in a constricted part 84c formed in the middle portion of the second rotor 84 in the direction of the long axis LX. Alternatively an end 84t of the second rotor 84 in the direction of the long axis LX may be fit in a constricted part 83c of the first rotor 83.

The pump chamber 82 is formed in a sectional shape by linking a circle C1 about the main rotating shaft 83x with a circle C2 about the driven rotating shaft 84x in a partly overlapping manner (as shown by the left-side drawing). An intake port 85 and an exhaust port 86 are provided to be opposed to each other in a center overlapped area of the two circles C1 and C2 in the pump chamber 82.

The first rotor 83 and the second rotor 84 are rotated in opposite directions as shown by arrows at the same rotation speed by the rotational driving force of the rotor actuator 81. This results in repeating suction of gas through the intake port 85 and discharge of compressed gas through the exhaust port 86. The intake port 85 is connected with the gas liquid separator 58 shown in FIG. 1, and the exhaust port 86 is connected with the supply passage 53 shown in FIG. 1. The hydrogen circulation pump 55 having the configuration described above circulates the exhaust gas (hydrogen gas) discharged from the fuel cell 40 to the supply passage 53 by the rotations of the rotor actuator 81 and the second rotor 84.

A distance Da between the inner wall surface 82s of the pump chamber 82 and the end 83t or 84t of the first rotor 83 or the second rotor 84 in the direction of the long axis LX (shown in the left-side drawing) may be, for example, in a range of 20 to 50 μm. A distance Db between end faces 83p and 84p of the first rotor 83 and the second rotor 84 in the direction along the rotating axes RXa and RXb of the first rotor 83 and the second rotor 84 and the inner wall surface 82s of the pump chamber 82 opposed to the end faces 83p and 84p (shown in the right-side drawing) may be, for example, in a range of 10 to 60 μm. The distance Db may be more specifically in a range of 15 to 25 μm. This configuration more effectively provides a state that the residual water remaining in the pump chamber 82 or the water flowing through the circulation passage 54 into the hydrogen circulation pump 55 is extended along the inner wall surface 82s in a freeze state start-up control described later. This contributes to suppress seizure of the hydrogen circulation pump 55 in a low-temperature environment (described later in detail).

Figure 3:
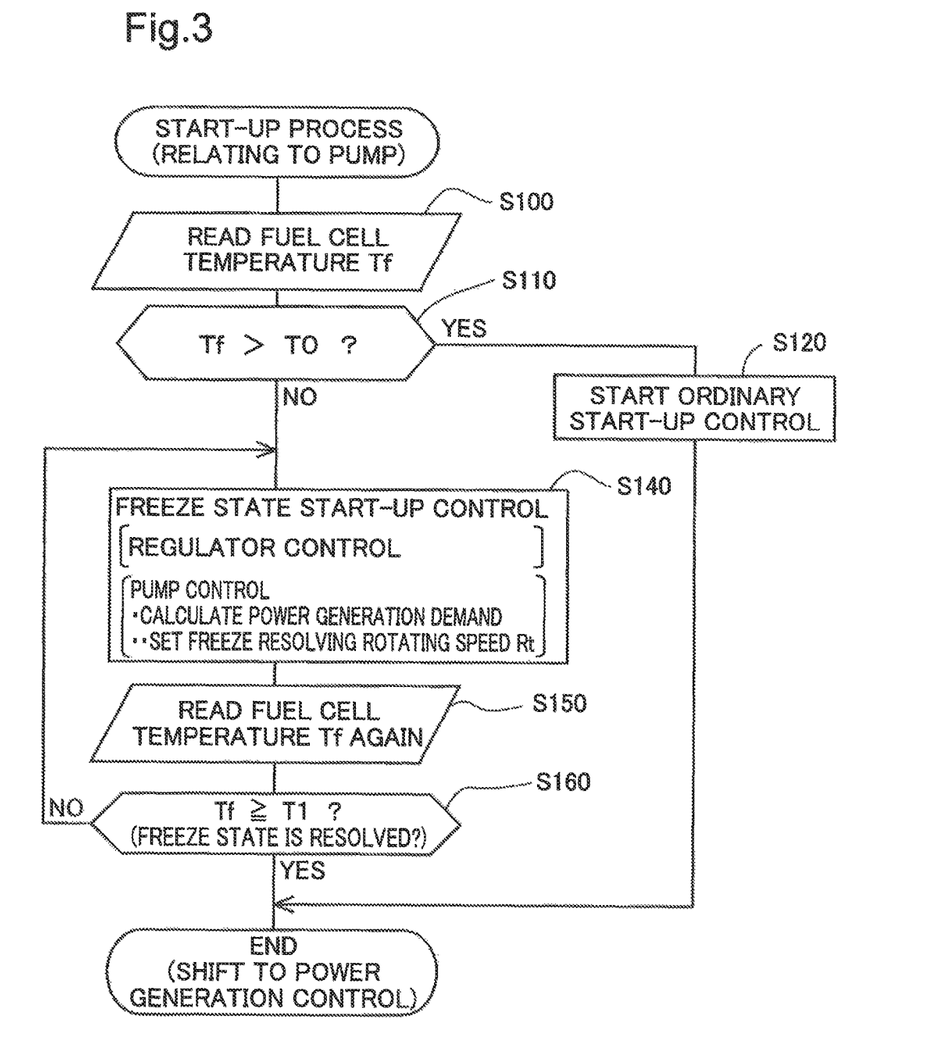
FIG. 3 is a flowchart showing a start-up process routine of a fuel cell system performed by a controller.

FIG. 3 is a flowchart showing a start-up process routine of the fuel cell system 30 performed by the controller 100. This start-up process performs device control relating to the hydrogen circulation pump 55 and is triggered by an ON operation of a start switch (not shown) (STON) of the fuel cell vehicle 20 and is performed by the controller 100. After an ON operation of the start switch (STON), the controller 100 first reads the temperature Tf of the fuel cell 40 (hereinafter referred to as fuel cell temperature Tf) from the sensor output of the temperature sensor 74 (step S100). Accordingly the temperature sensor 74 and the controller 100 involved in reading the fuel cell temperature Tf constitute a temperature acquirer configured to obtain the temperature of the fuel cell 40 at a start-up time. This fuel cell temperature Tf is a temperature that determines the temperature of water introduced through the circulation passage 54 into the hydrogen circulation pump 55. The temperature of water introduced into the hydrogen circulation pump 55 may thus be determined directly or indirectly from the fuel cell temperature Tf.

The controller 100 subsequently compares the fuel cell temperature Tf with a threshold temperature T0 (step S110). This threshold temperature T0 is a predetermined temperature that is not higher than zero degree Celsius and denotes a temperature (reference temperature) at which the residual water that remains in the fuel cell 40 or more specifically in the anode passage of the unit cells 41 is likely to be supercooled to supercooled water with decreases in the ambient temperature and in the fuel cell temperature Tf and is likely to flow from the fuel cell 40 through the circulation passage 54 into the hydrogen circulation pump 55. The controller 100 may store the threshold temperature T0 (for example, −10° C. to 0° C.) that may be determined in advance by experiment or simulation using the actual fuel cell system 30, in a predetermined storage area. The state that water remains in the anode passage of the unit cells 41 may arise when the fuel cell 40 that is operated to generate electric power in a low temperature environment is stopped and causes water produced immediately before the stop of operation to remain as the residual water.

In the case of an affirmative answer at step S110 that the fuel cell temperature Tf is higher than the threshold temperature T0, the controller 100 starts an ordinary start-up control (step S120) on the assumption that supercooled water is unlikely to flow into the hydrogen circulation pump 55, and subsequently terminates this routine. In the ordinary start-up control, the controller 100 supplies the hydrogen gas and the air to meet a power generation demand at a system start-up time, for example, an idling power generation demand for warm-up or a power generation demand according to the accelerator operation and the vehicle speed, so as to start up and operate the fuel cell 40. The controller 100 drives and controls the hydrogen circulation pump 55, in order to supply the hydrogen gas at the supply amount corresponding to the power generation demand at the system start-up time, along with the flow rate regulated by the regulator 52 in the supply passage 53. The rotation speed of the first rotor 83 and the second rotor 84 of the hydrogen circulation pump 55 is controlled to a predetermined rotation speed (for example, about 800 to 2000 rpm) corresponding to the power generation demand at the system start-up time. This predetermined rotation speed (for example, about 800 to 2000 rpm) corresponds to the subordinate concept of the first rotation speed in the claims. After starting the ordinary start-up control at step S120, the controller 100 terminates this start-up process routine and shifts to power generation control (not shown) that supplies the gases at the supply amounts corresponding to the power generation demand according to the accelerator operation and the like.

In the case of a negative answer at step S110 that the fuel cell temperature Tf is not higher than the threshold temperature T0, on the other hand, the controller 100 performs a freeze state start-up control (step S140) on the assumption that supercooled water is likely to flow into the hydrogen circulation pump 55.

In the freeze state start-up control at step S140, the controller 100 supplies the hydrogen gas by controlling the regulator 52, while circulating and supplying the exhaust gas by controlling the hydrogen circulation pump 55. The regulator control controls the regulator 52 in the same manner as that in the ordinary start-up control at step S120 to supply the hydrogen gas at the supply amount corresponding to the power generation demand at the system start-up time. The pump control drives and controls the hydrogen circulation pump 55 at the rotation speed of the first rotor 83 and the second rotor 84 of the hydrogen circulation pump 55 that is set in the freeze state start-up using the power generation demand at the system start-up time and the fuel cell temperature Tf. In the pump control, the controller 100 calculates the power generation demand at the system start-up time. The controller 100 subsequently sets the rotation speed of the first rotor 83 and the second rotor 84 of the hydrogen circulation pump 55 in the freeze state start-up (freeze resolving rotation speed Rt) to a predetermined rotation speed (for example, about 550 to 650 rpm) using the calculated power generation demand at the system start-up time and the fuel cell temperature Tf. This predetermined rotation speed (for example, about 550 to 650 rpm) corresponds to the subordinate concept of the second rotation speed in the claims. The controller 100 then controls rotation of the first rotor 83 and the second rotor 84 of the hydrogen circulation pump 55 at the set freeze resolving rotation speed Rt for a predetermined time period (for example, about 10 to 15 seconds) (step S140). From the beginning of the freeze state start-up control at step S140, the fuel cell 40 receives the supplies of the hydrogen gas and the air and generates electric power. The rotation speed of the rotors 83 and 84 of the hydrogen circulation pump 55 is, however, limited to the low rotation speed as described above. This reduces the circulated and supplied amount and thereby generates the smaller amount of electric power than the amount of electric power generated in the ordinary start-up control at step S120.

The freeze resolving rotation speed Rt of the first rotor 83 and the second rotor 84 of the hydrogen circulation pump 55 in the freeze state start-up control at step S140 described above is set using the power generation demand at the system start-up time and the fuel cell temperature Tf, such that the lower rotation speed in the above rotation speed range is provided at the lower fuel cell temperature Tf. This freeze resolving rotation speed Rt (for example, about 550 to 650 rpm) is the rotation speed set when the fuel cell temperature Tf is not higher than the threshold temperature T0. In the state of the same power generation demand at the system start-up time as that in the ordinary start-up control at step S120, this freeze resolving rotation speed Rt is set to be lower than the rotation speed (for example, about 800 to 2000 rpm) in the ordinary start-up control that is performed when the fuel cell temperature Tf is higher than the threshold temperature T0. The freeze resolving rotation speed Rt (for example, about 550 to 650 rpm) that is set when the fuel cell temperature Tf is not higher than the threshold temperature T0 is the rotation speed in the low rotation speed range that enables the supercooled water flowing from the fuel cell 40 into the hydrogen circulation pump 55 to be extended between the inner wall surface 82s and each of the first rotor 83 and the second rotor 84. The freeze resolving rotation speed Rt may be determined in advance by experiment or simulation using the actual fuel cell system 30 and is stored in the controller 100. The freeze state start-up control (step S140) that controls rotation of the rotors at the freeze resolving rotation speed Rt more effectively provides the state that the residual water remaining in the pump chamber 82 or the water flowing through the circulation passage 54 into the hydrogen circulation pump 55 is extended along the inner wall surface 82s. This accordingly suppresses seizure of the first rotor 83 and the second rotor 84 of the hydrogen circulation pump 55 caused by freezing of water. This mechanism is described below with reference to the configuration of the hydrogen circulation pump 55.

Figure 4:
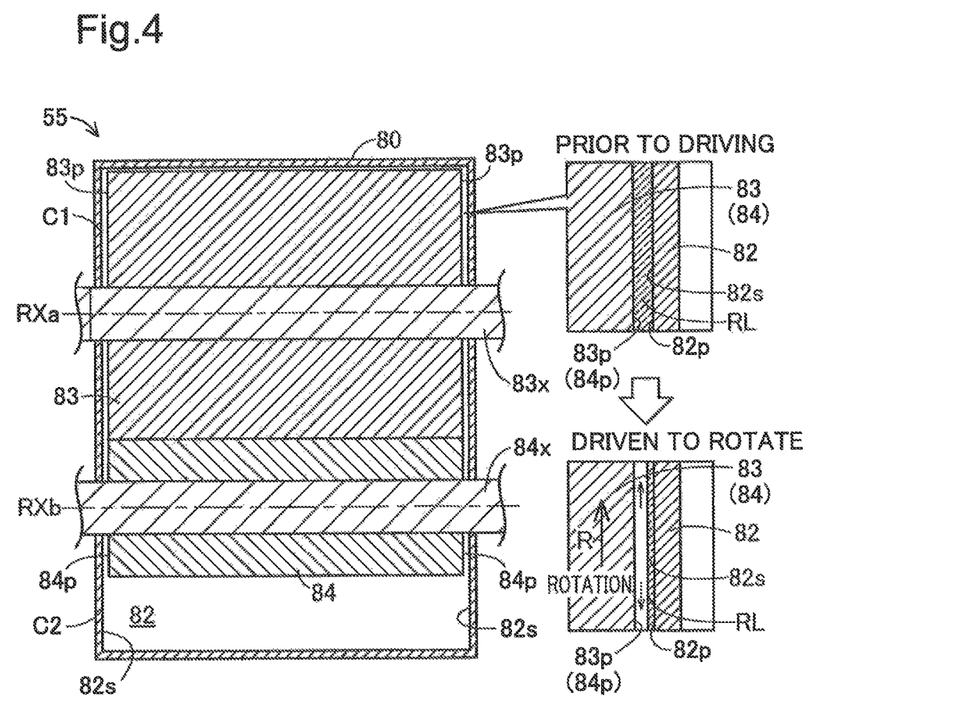
FIG. 4 is a schematic diagram illustrating a mechanism of suppressing seizure of a rotor caused by freezing of water in the rotor.

FIG. 4 is a schematic diagram illustrating the mechanism of suppressing seizure of a rotor caused by freezing of water in the rotor. In the hydrogen circulation pump 55, water is likely to remain in the pump chamber 82 even after a stop of operation of the fuel cell 40, and water (supercooled water) is likely to flow, together with the exhaust gas supplied by controlling the regulator 52, from the fuel cell 40 through the circulation passage 54 into the pump chamber 82. Such in-rotor water RL is likely to enter between the first rotor 83 and the inner wall surface 82s of the pump chamber 82 and between the second rotor 84 and the inner wall surface 82s of the pump chamber 82. When the temperature of the hydrogen circulation pump 55 is a subzero temperature to supercool the in-rotor water RL, driving the hydrogen circulation pump 55 to rotate the first rotor 83 and the second rotor 84 at the low rotation speed described above causes the in-rotor water RL to be extended in a film state along the inner wall surface 82s of the pump chamber 82.

The inner wall surface 82s of the pump chamber 82 is located on the outer side of the first rotor 83 and the second rotor 84. In a low temperature environment, the rotor chamber assembly 80 exposed to the low temperature outside air has a low temperature and thereby causes the extended in-rotor water RL to be supercooled on the inner wall surface 82s of the rotor chamber assembly 80. When the in-rotor water RL in the hydrogen circulation pump 55 is supercooled, rotation of the first rotor 83 and the second rotor 84 of the hydrogen circulation pump 55 gives an impact on the supercooled in-rotor water RL in the hydrogen circulation pump 55. This impact triggers freezing of the in-rotor water RL in a film state on the inner wall surface 82s-side having the lower temperature than the rotors 83 and 84. This accordingly does not cause the in-rotor water RL to be frozen and block between the inner wall surface 82s and the respective rotors 83 and 84 and thereby suppresses seizure of the first rotor 83 and the second rotor 84 in the state linked with the inner wall surface 82s by the frozen in-rotor water RL. The frozen part of the in-rotor water RL on the inner wall surface 82s-side may be scraped off by the first rotor 83 and the second rotor 84 that rotate at the low rotation speed as described above. This accordingly keeps the first rotor 83 and the second rotor 84 to be rotatable. According to this embodiment, the hydrogen circulation pump 55 is a roots pump and has the large areas of the end faces 83p and 84p of the respective rotors 83 and 84. A large amount of the in-rotor water RL may thus be present between the end faces 83p and 84p of the rotors 83 and 84 and the inner wall surface 82s. Even in this case, the pump control performed in the low temperature environment at step S140 can suppress seizure of the first rotor 83 and the second rotor 84 caused by freezing of the in-rotor water RL.

Subsequent to the freeze state start-up control at step S140 described above, the controller 100 reads the fuel cell temperature Tf again (step S150) and compares the read fuel cell temperature Tf with a reference temperature T1 (step S160). This reference temperature T1 is higher than the threshold temperature T0 used at step S110 and is a temperature that allows the supercooled state of water in the fuel cell 40 to be resolved. The controller 100 may store the reference temperature T1 (for example, 2° C. to 5° C.) that may be determined in advance by experiment or simulation using the actual fuel cell system 30, together with the threshold temperature T0, in the predetermined storage area.

In the case of a negative answer at step S160 that the fuel cell temperature Tf is lower than the reference temperature T1 (>T0), the controller 100 returns the processing flow to step S140 on the assumption that supercooled water is still likely to flow from the fuel cell 40 into the hydrogen circulation pump 55. In the case of an affirmative answer at step S160 that the fuel cell temperature Tf is equal to or higher than the reference temperature T1 (>T0), on the other hand, the controller 100 determines that the inflow of supercooled water from the fuel cell 40 into the hydrogen circulation pump 55 is resolved and terminates this start-up process routine. After terminating this start-up process routine, the controller 100 shifts to the power generation control, as in the case of the flow proceeding to step S120.

Figure 5:
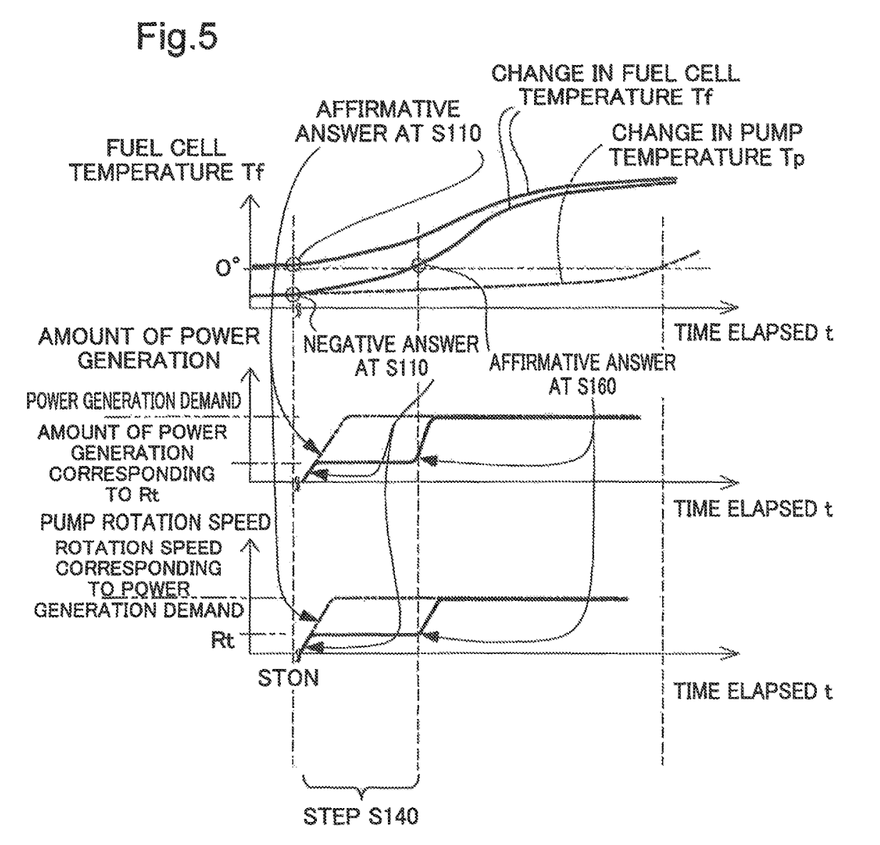
FIG. 5 is a chart schematically showing time series pump control with changes in fuel cell temperature and pump temperature after an ON operation of a start switch (STON)

The fuel cell system 30 of the above configuration mounted on the fuel cell vehicle 20 according to the embodiment performs the freeze state start-up control (step S140) described above when the fuel cell temperature Tf is not higher than the threshold temperature T0 (negative answer at step S110 in FIG. 3) at the start-up time of the fuel cell 40 and makes supercooled water likely to flow from the fuel cell 40 through the circulation passage 54 into the hydrogen circulation pump 55. This provides the following advantages. FIG. 5 is a chart schematically showing time series pump control with changes in the fuel cell temperature Tf and pump temperature Tp after an ON operation of the start switch (STON).

When the fuel cell temperature Tf is lower than the threshold temperature T0 (for example, −10° C. to 0° C.) at the time of the ON operation of the start switch (STON), the low temperature of the fuel cell 40 makes the supercooled water likely to flow from the fuel cell 40 through the circulation passage 54 into the hydrogen circulation pump 55, accompanied with the subsequent supply of the hydrogen gas. When no measure is taken in this situation, the first rotor 83 and the second rotor 84 of the hydrogen circulation pump 55 are rotated at a relatively high rotation speed (for example, about 800 to 2000 rpm) corresponding to the power generation demand at the system start-up time. The supercooled water flowing into the hydrogen circulation pump 55 accordingly receives an impact from the respective rotors 83 and 84 and is likely to be locally frozen in the place where the impact is received and cause seizure of the rotor.

When the fuel cell 40 has low temperature (fuel cell temperature Tf<threshold temperature T0 (for example, −10° C. to 0° C.)) and thereby makes the supercooled water likely to flow from the fuel cell 40 through the circulation passage 54 into the hydrogen circulation pump 55, the fuel cell system 30 of the embodiment rotates the first rotor 83 and the second rotor 84 of the hydrogen circulation pump 55 at the freeze resolving rotation speed Rt (for example, about 550 to 650 rpm) that is the low rotation speed set using the power generation demand at the system start-up time and the fuel cell temperature Tf (step S140). This freeze resolving rotation speed Rt (for example, about 550 to 650 rpm) is lower than the rotation speed (for example, about 800 to 2000 rpm) in the ordinary start-up control that is performed when the fuel cell temperature Tf is higher than the threshold temperature T0, in the state of the same power generation demand at the system start-up time as that in the ordinary start-up control (step S120). The supercooled water (in-rotor water RL) flowing into the hydrogen circulation pump 55 is accordingly extended between the inner wall surface 82s and the respective rotors 83 and 84 by the rotors 83 and 84 rotating at the freeze resolving rotation speed Rt that is the low rotation speed (for example, about 550 to 650 rpm) (as shown in FIG. 4).

The fuel cell system 30 of the embodiment reduces the likelihood that the first rotor 83 and the second rotor 84 rotating at high speed are exposed to the supercooled water (in-rotor water RL). The fuel cell system 30 of the embodiment causes the supercooled water (in-rotor water RL) to be extended and thereby reduces or avoids the state that the supercooled water (in-rotor water RL) is locally frozen and the state that the supercooled water (in-rotor water RL) is frozen to block between the inner wall surface 82s and the respective rotors 83 and 84. Additionally, even if the supercooled water flowing into the hydrogen circulation pump 55 is frozen, the supercooled water is extended between the inner wall surface 82 and the respective rotors 83 and 84 and is thereby frozen in a film state on the inner wall surface 82s-side. The frozen part of the supercooled water (in-rotor water RL) on the inner wall surface 82s-side may thus be scrapped off by the first rotor 83 and the second rotor 84 rotating at the freeze resolving rotation speed Rt that is the low rotation speed (for example, about 550 to 650 rpm). As a result, the fuel cell system 30 of the embodiment suppresses the hydrogen circulation pump 55 from being frozen at the fuel cell start-up time under the low temperature environment.

Figure 6:
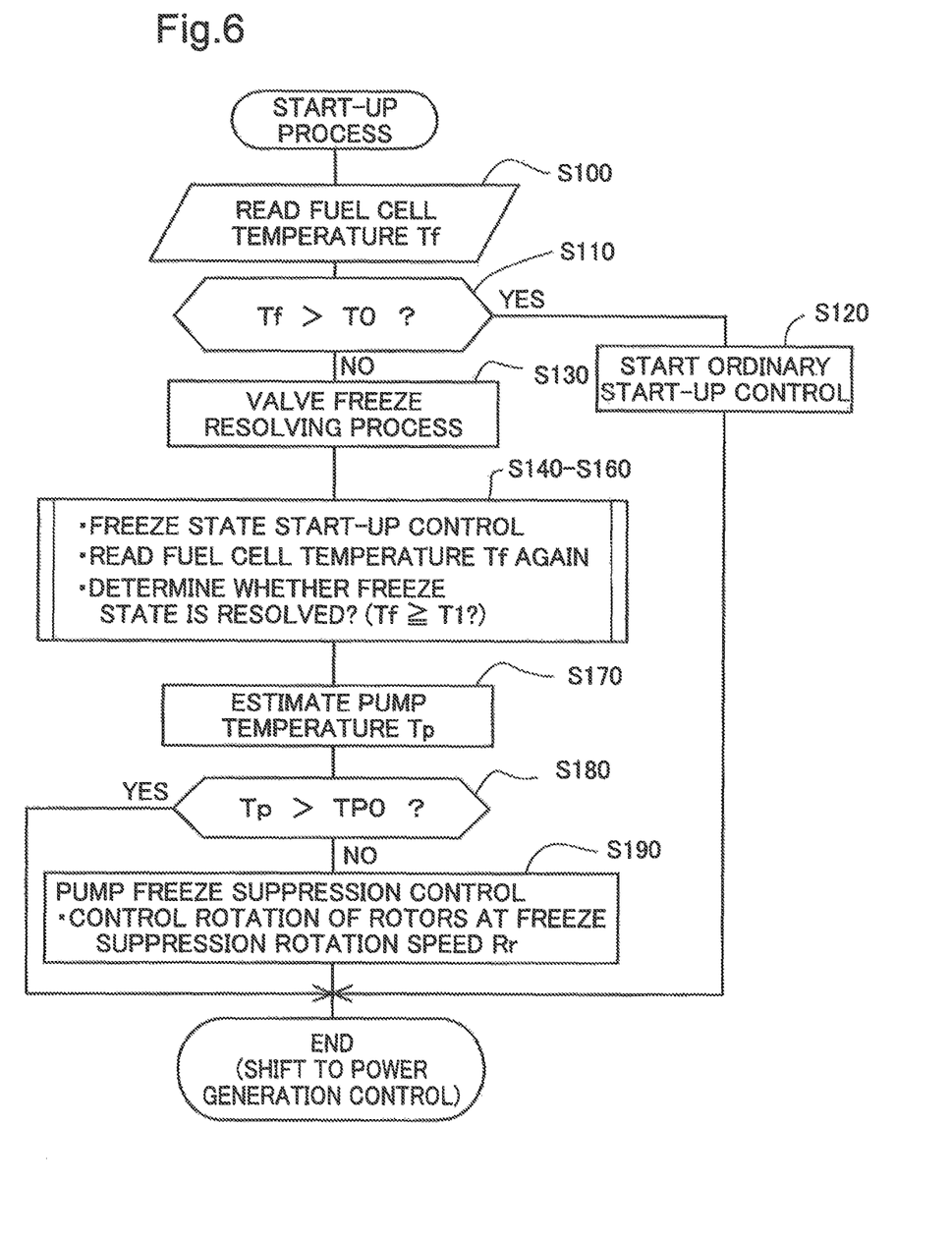
FIG. 6 is a flowchart showing a start-up process routine of the fuel cell system performed by the controller according to another embodiment.

The following describes a start-up process according to another embodiment. The start-up process of another embodiment is characterized by valve control in the cathode gas supply discharge mechanism 60 and water suction into the hydrogen circulation pump 55, in combination with the control relating to the hydrogen circulation pump 55 described above. FIG. 6 is a flowchart showing a start-up process routine according to another embodiment performed by the controller 100. This start-up process is triggered by an ON operation of a start switch (not shown) (STON) of the fuel cell vehicle 20 and is performed by the controller 100. Like the start-up process of the above embodiment, the controller 100 reads the fuel cell temperature Tf from the sensor output of the temperature sensor 74 (step S100) and compares the fuel cell temperature Tf with the threshold temperature T0 (step S110).

In the case of an affirmative answer at step S110 that the fuel cell temperature Tf is higher than the threshold temperature T0, the controller 100 starts the ordinary start-up control as described above (step S120) on the assumption that the supercooled water is unlikely to flow into the hydrogen circulation pump 55 and then terminates this routine. The rotation speed of the first rotor 83 and the second rotor 84 of the hydrogen circulation pump 55 in this state is the predetermined rotation speed (for example, about 800 to 2000 rpm) corresponding to the power generation demand at the system start-up time, as described above. After terminating this start-up process routine, the controller 100 shifts to power generation control (not shown) that supplies the gases at the supply amounts corresponding to the power generation demand according to the accelerator operation and the like.

In the case of a negative answer at step S110 that the fuel cell temperature Tf is not higher than the threshold temperature T0, on the other hand, the controller 100 performs a valve freeze resolving process (step S130), prior to the freeze state start-up control (step S140) described above.

The valve freeze resolving process at step S130 is a process prepared for the freeze state start-up control (step S140) and performed to resolve the freeze state that is expected in the first motor-operated valve 11 and the second motor-operated valve 12 of the cathode gas supply discharge mechanism 60 (shown in FIG. 1). More specifically, the controller 100 performs forward/rearward rotation control of the flow dividing valve motor 64 included in the first motor-operated valve 11 and of the pressure regulating valve motor 68 included in the second motor-operated valve 12 at predetermined time intervals (for example, at cycles of about 1 second) to open and close the first motor-operated valve 11 and the second motor-operated valve 12. The valve freeze resolving process at step S130 is performed for a time period (for example, about 3 seconds) that may be determined by experiment or simulation using the actual fuel cell system 30 as a time duration required to resolve the freeze state of the motor-operated valves 11 and 12. This breaks the ice in the frozen part and thereby resolves the freeze state of the motor-operated valves 11 and 12.

After the valve freeze resolving process at step S130, the controller 100 performs the freeze state start-up control at step S140, reads the fuel cell temperature Tf again at step S150 and determines whether the freeze state of the hydrogen circulation pump 55 is resolved at step S160 as described above. In the case of an affirmative answer at step S160 that the fuel cell temperature Tf is equal to or higher than the reference temperature T1 (>T0), the controller 100 estimates a pump temperature Tp of the hydrogen circulation pump 55 (step S170) on the assumption that the inflow of the supercooled water from the fuel cell 40 into the hydrogen circulation pump 55 is resolved. Any of various techniques may be employed to estimate the pump temperature Tp. For example, the pump temperature Tp may be estimated, based on the fuel cell temperature Tf of the fuel cell 40 read again at step S150. More specifically, the controller 100 may have a map that is provided in advance by experiment or the like and indicates a unique correlation of the temperature change of the hydrogen circulation pump 55 to the temperature change of the fuel cell 40 after the stop of operation. The controller 100 may refer to this map and obtain an estimated value of temperature of the hydrogen circulation pump 55 corresponding to the fuel cell temperature Tf of the fuel cell 40. Instead of this method using the map, the following method may be employed to estimate the pump temperature Tp of the hydrogen circulation pump 55 based on the fuel cell temperature Tf of the fuel cell 40. The controller 100 may obtain the measurement value of the temperature sensor 74 that indicates the outlet temperature of the fuel cell 40 as the fuel cell temperature Tf of the fuel cell 40 and multiply the obtained fuel cell temperature Tf by a predetermined coefficient to determine an estimated value of first amount of heat of the hydrogen circulation pump 55. The controller 100 may subsequently obtain an estimated value of second amount of heat that is transferred from the hydrogen circulation pump 55 to the outside based on the ambient temperature. The controller 100 may then subtract the estimated second amount of heat from the estimated first amount of heat, so as to obtain an estimated value of amount of temperature change of the hydrogen circulation pump 55 and thereby estimate the current pump temperature Tp of the hydrogen circulation pump 55. Another available method may use a temperature sensor mounted to the rotor chamber assembly 80 as the outer shell of the hydrogen circulation pump 55 and directly determine the pump temperature Tp.

For example, the estimated value of the pump temperature Tp of the hydrogen circulation pump 55 obtained at step S170 may indicate the temperature of the first rotor 83 and the second rotor 84 of the hydrogen circulation pump 55 or may indicate the temperature of the inner wall surface 82s of the pump chamber 82 in the hydrogen circulation pump 55. Specifically the estimated value of the pump temperature Tp of the hydrogen circulation pump 55 may indicate the temperature of the first rotor 83 and the second rotor 84 of the hydrogen circulation pump 55. This further enhances the relationship between the estimated value of the pump temperature Tp of the hydrogen circulation pump 55 and the possibility of seizure of the respective rotors 83 and 84 in the hydrogen circulation pump 55 caused by freezing of the in-rotor water RL. More specifically the estimated value of the pump temperature Tp of the hydrogen circulation pump 55 may indicate the temperature of the pump chamber 82 in the hydrogen circulation pump 55. This enables the environment condition that causes the in-rotor water RL in the pump chamber 82 to be extended and frozen along the inner wall surface 82s of the pump chamber 82, to be more adequately reflected on the estimated value of the pump temperature Tp of the hydrogen circulation pump 55.

Subsequent to step S170, the controller 100 compares the estimated pump temperature Tp of the hydrogen circulation pump 55 with a threshold temperature TP0 (step S180). This threshold temperature TP0 denotes a temperature at which water entering the hydrogen circulation pump 55 and adhering to the first rotor 83 or the second rotor 84 (hereinafter referred to as "rotor adhering water") is likely to be frozen at the adhering location due to the low rotor temperature (low pump temperature Tp). The threshold temperature TP0 closes to a freezing point of rotor adhering water. The controller 100 may store the threshold temperature TP0 (for example, −10° C. to 0° C.) that may be determined in advance by experiment or simulation using the actual fuel cell system 30, in a predetermined storage area.

In the case of an affirmative answer at step S180 that the pump temperature Tp is higher than the threshold temperature TP0, the controller 100 terminates this routine on the assumption that the rotor adhering water that enters the hydrogen circulation pump 55 and adheres to the first rotor 83 or the second rotor 84 is unlikely to be frozen. After terminating this routine, the controller 180 shifts to the power generation control, as in the case of the flow proceeding to step S120.

In the case of a negative answer at step S180 that the pump temperature Tp is not higher than the threshold temperature TP0, on the other hand, the controller 100 performs a pump freeze suppression control (step S190) on the assumption that the rotor adhering water is likely to be frozen in the hydrogen circulation pump 55.

Water is likely to be accumulated in the hydrogen circulation pump 55, due to the inflow of water from the fuel cell 40 and the suction of water by the gas liquid separator 58. The pump freeze suppression control at step S190 is, however, performed only in the case of an affirmative answer at step S160 (Tf≥T1 which suggests resolution of the inflow of supercooled water). It is thus enough to suppress freezing of water accumulated due to the suction of water by the gas liquid separator 58. The pump freeze suppression control at step S190 accordingly sets the rotation speed of the first rotor 83 and the second rotor 84 of the hydrogen circulation pump 55 to be lower than a specified rotation speed that causes the water accumulated by the gas liquid separator 58 to be sucked through the circulation passage 54 into the hydrogen circulation pump 55 and drives the hydrogen circulation pump 55. More specifically, in the pump freeze suppression control, the controller 100 controls rotation of the first rotor 83 and the second rotor 84 of the hydrogen circulation pump 55 at a freeze suppression rotation speed Rr (for example, about 1500 rpm) that suppresses the suction of water for a predetermined time period (for example, about 10 to 20 seconds). After the rotation control of the hydrogen circulation pump 55 for the predetermined time period, the controller 100 terminates this routine. After terminating this routine, the controller 180 shifts to the power generation control, as in the case of the flow proceeding to step S120. According to a modification, after the pump freeze suppression control at step S190, the controller 100 may newly estimate the pump temperature Tp, compare the newly estimated pump temperature Tp with the threshold temperature TP0 and determine whether the pump freeze suppression control of step S190 is to be continued or the routine is to be terminated, based on the result of the comparison.

Figure 7:
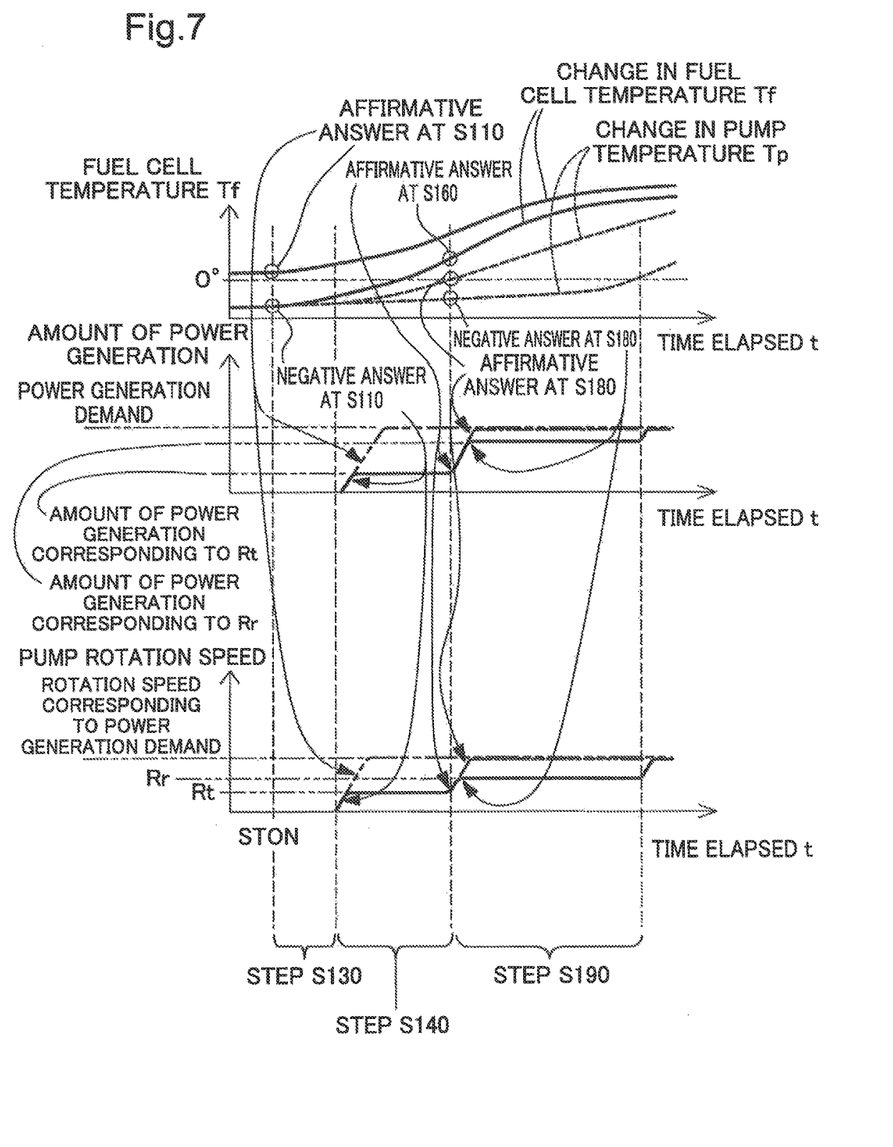
FIG. 7 is a chart schematically showing time-series pump control according to the embodiment configured to perform the start-up process of FIG. 6.

The fuel cell system 30 of the embodiment configured to perform the start-up process shown in FIG. 6 has the following advantages. FIG. 7 is a chart schematically showing time-series pump control according to the embodiment configured to perform the start-up process of FIG. 6.

When the fuel cell temperature Tf is not higher than the threshold temperature T0 (for example, −10° C. to 0° C.) at the time of the ON operation of the start switch (STON) (in the case of a negative answer at step S110), the controller 100 of this embodiment performs the valve freeze resolving process (step S130) that controls opening and closing of the first motor-operated valve 11 and the second motor-operated valve 12 in the cathode gas supply discharge mechanism 60 (shown in FIG. 1). When the fuel cell temperature Tf is lower than the threshold temperature T0 (for example, −10° C. to 0° C.), the fuel cell system 30 of this embodiment resolves in advance freeze of these motor-operated valves 11 and 12 to be prepared for the start-up of the fuel cell under the low temperature environment.

The start-up process of this embodiment performs the valve freeze resolving process (step S130) prior to the freeze state start-up control (step S140). Accordingly controlling the rotation speed of the rotors 83 and 84 of the hydrogen circulation pump 55 can be performed in the state that the air supply in the cathode gas supply discharge mechanism 60 at the system start-up time is adequately controlled. This configuration increases the effectiveness of suppressing the hydrogen circulation pump 55 from being frozen in the low temperature environment in the freeze state start-up control at step S140.

In the fuel cell system 30 of this embodiment, the gas liquid separator 58 is placed on the upstream side of the hydrogen circulation pump 55 in the circulation passage 54. In the process of suction of the gas (exhaust gas) by the hydrogen circulation pump 55 after gas liquid separation by the gas liquid separator 58, when the pump temperature Tp of the hydrogen circulation pump 55 is not higher than the threshold temperature TP0 that makes the rotor adhering water likely to be frozen at the adhering location (in the case of a negative answer at step S180), the fuel cell system 30 of the embodiment sets the rotation speed of the first rotor 83 and the second rotor 84 of the hydrogen circulation pump 55 to the freeze suppression rotation speed Rr (for example, about 1500 rpm) that suppresses the water accumulated by the gas liquid separator 58 from being sucked through the circulation passage 54 into the hydrogen circulation pump 55 (step S190). The fuel cell system 30 of the embodiment does not allow the water accumulated by the gas liquid separator 58 to be sucked into the hydrogen circulation pump 55 when the pump temperature Tp of the hydrogen circulation pump 55 is not higher than the threshold temperature TP0 as described above. This suppresses freezing of water adhering to the first rotor 83 and the second rotor 84 of the hydrogen circulation pump 55. The temperature of the fuel cell 40 is raised (Tf≥T1) after the system start-up, before the rotation speed of the rotors 83 and 84 is set to the freeze suppression rotation speed Rr (for example, about 1500 rpm). Accordingly the fuel cell system 30 of this embodiment causes the exhaust gas warmed in the fuel cell 40 to be subjected to gas liquid separation by the gas liquid separator 58 and then sucked into the hydrogen circulation pump 55. This raises the temperature of the hydrogen circulation pump 55 and suppresses freezing or melts the frozen part if any.

When the fuel cell temperature Tf reaches the reference temperature T1 (>T0) (step S160) during repetition of controlling the first rotor 83 and the second rotor 84 at the freeze resolving rotation speed Rt (steps S140 and S150), the fuel cell system 30 of this embodiment stops controlling the rotation speed of the rotors 83 and 84. The fuel cell system 30 of this embodiment accordingly does not unnecessarily continue controlling the rotors 83 and 84 at the freeze resolving rotation speed Rt that is the low rotation speed.

The disclosure is not limited to any of the embodiments, the examples and the modifications described above but may be implemented by a diversity of other configurations without departing from the scope of the disclosure. For example, the technical features of any of the embodiments, the examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

The embodiment described above uses the hydrogen circulation pump 55 that is the roots pump having the first rotor 83 and the second rotor 84 of the cocoon sectional shape. This configuration is, however, not restrictive. For example, the hydrogen circulation pump 55 may be a roots pump having trefoil rotors or may be a non-roots pump. The hydrogen circulation pump 55 may be any pump having a rotating body and may be, for example, a screw pump. The predetermined rotation speed (for example, about 800 to 2000 rpm) corresponding to the power generation demand at the system start-up time and the freeze resolving rotation speed Rt (for example, about 550 to 650 rpm) of the first rotor 83 and the second rotor 84 of the hydrogen circulation pump 55 in the freeze state start-up control may be set according to the configuration of the hydrogen circulation pump 55. For example, the freeze resolving rotation speed Rt may be set to a lower rotation speed range, for example, about 200 to 300 rpm. The freeze suppression rotation speed Rr that does not allow the water accumulated by the gas liquid separator 58 to be sucked through the circulation passage 54 into the hydrogen circulation pump 55 may also be set to a rotation speed range, for example, about 1400 to 1600 rpm.

In the start-up process of the embodiment shown in FIG. 6, either of the valve freeze resolving process at step S130 and the pump freeze suppression process of steps S170 to S190 may be omitted.

The series of pump freeze suppression process of steps S170 to S190 in the start-up process of the embodiment shown in FIG. 6 sets the rotation speed of the first rotor 83 and the second rotor 84 of the hydrogen circulation pump 55 to be lower than the rotation speed that allows the water accumulated by the gas liquid separator 58 to be sucked through the circulation passage 54 into the hydrogen circulation pump 55, when the temperature Tp of the hydrogen circulation pump 55 is not higher than the threshold temperature TP0 at which the rotor adhering water that adheres to the first rotor 83 or the second rotor 84 is likely to be frozen. The fuel cell system 30 may perform only this pump freeze suppression process.

What is claimed is:

1. A fuel cell system, comprising:
   a fuel cell;
   a circulation passage that is configured to circulate an exhaust gas discharged from the fuel cell, to a supply port of a fuel gas in the fuel cell;
   a hydrogen gas pump that is provided in the circulation passage and is configured to have a rotating body and circulate the exhaust gas discharged from the fuel cell to the fuel cell by rotation of the rotating body;
   a hydrogen gas pump controller that is programmed to control rotation speed of the rotating body of the hydrogen gas pump;
   a demand acquirer that is configured to obtain a power generation demand for the fuel cell; and
   a temperature acquirer that is configured to obtain temperature of the fuel cell at which water introduced through the circulation passage into the hydrogen gas pump is generated, at a start-up time of the fuel cell, wherein
   the hydrogen gas pump controller is programmed to:
      obtain a first rotation speed in accordance with the obtained power generation demand when the fuel cell starts power generation,
      control a rotation speed of the rotating body of the hydrogen gas pump to the first rotation speed corresponding to the power generation demand, when the temperature of the fuel cell when the fuel cell starts power generation is higher than a predetermined reference temperature that is not higher than zero degree Celsius, and
      control, only once during each power generation by the fuel cell, the rotation speed of the rotating body of the hydrogen gas pump to a second rotation speed that is greater than zero and is lower than the first rotation speed, when the temperature of the fuel cell when the fuel cell starts power generation is not higher than the reference temperature, wherein
   the reference temperature is a temperature that allows the water to be introduced in a supercooled state into the hydrogen gas pump, and
   the second rotation speed that is a rotation speed in a low rotation speed range that allows the water in the supercooled state introduced into the hydrogen gas pump to be extended between the rotating body and a rotating body-surrounding housing wall.

2. The fuel cell system according to claim 1, further comprising:
   a gas liquid separator that is placed on an upstream side of the hydrogen gas pump in the circulation passage, wherein
   when determining that temperature of the hydrogen gas pump is not higher than a threshold temperature determined in advance as a temperature that is not higher than 0° Celsius at which water adhering to the rotating body is frozen, the hydrogen gas pump controller is programmed to set the rotation speed of the rotating body to be lower than a rotation speed that causes water accumulated by the gas liquid separator to be sucked through the circulation passage into the hydrogen gas pump.

* * * * *